Figure 2:
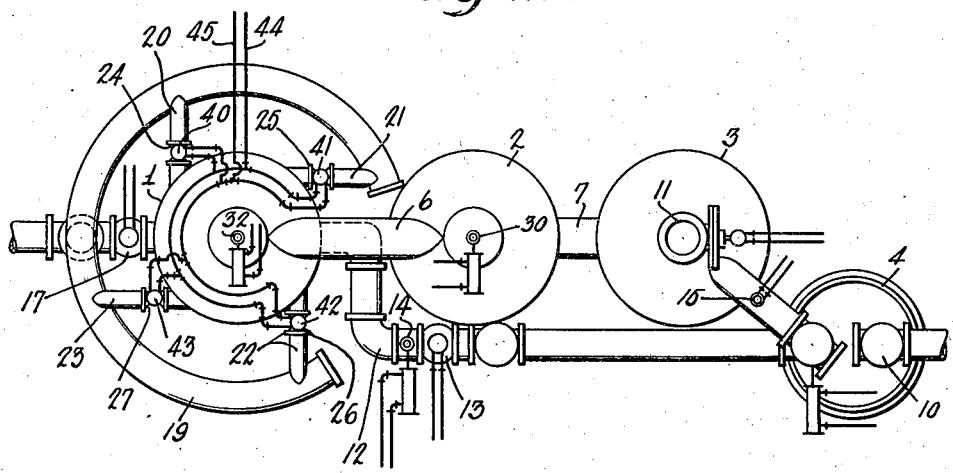

March 26, 1946.  J. S. HAUG  2,397,138

AIR ADMISSION TO GAS GENERATOR

Filed Oct. 16, 1941

Inventor:-
John S. Haug
by his Attorney
Hugo G. Kenman

Patented Mar. 26, 1946

2,397,138

UNITED STATES PATENT OFFICE 2,397,138

AIR ADMISSION TO GAS GENERATOR

John S. Haug, Philadelphia, Pa., assignor to United Engineers & Constructors, Inc., a corporation of Delaware Application October 16, 1941, Serial No. 415,233

15 Claims. (Cl. 48—80)

The present invention relates to the manufacture of combustible gas.

In the manufacture of water gas an ignited bed of solid fuel, such as for example coke, is alternately blasted with air and with steam. The air blasting step is commonly called the "blow," while the steam blasting step is commonly called the "run."

During the blow the temperature of the fuel bed in the generator is raised and heat stored therein for utilization in the endothermic water gas reaction during the succeeding run. Also during the blow, the producer gas produced in the fuel bed as a result of the air blasting operation is burned with secondary air and its heat stored in heat storage materials, such as for example, refractory linings and/or checker brick arranged in heat storage vessels such as for example, an igniter in the case of blue water gas manufacture or a carbureter and superheater in the case of carbureted water gas manufacture.

During the run, the steam passing through the fuel bed reacts with the carbon therein to form blue water gas, a mixture of hydrogen and carbon monoxide together with a small quantity of carbon dioxide. In carbureted water gas manufacture the blue water gas issuing from the fuel bed is passed through the carbureter and superheater containing the previously heated heat storage materials and is carbureted or enriched therein with oil gas produced by spraying petroleum oil into the path of stored heat. The oil is vaporized and cracked therein in the presence of the blue water gas and the excess steam passing therethrough from the fuel bed.

Especially in the case of the employment of so-called "heavy" carbureting oil, it has become the practice to utilize heat stored from the blast gases in the top of the generator for vaporizing and cracking at least a portion of the carbureting oil.

By "heavy" oil is meant such petroleum oils or residuums as yield appreciable quantities of coke on vaporization as compared with the minor quantities of coke yielded by the conventional "gas" oil.

The vaporization of such "heavy" oil in a usual checker filled carbureter requires frequent and costly interruptions of operation due to the necessity of cleaning checker brick, the interstices of which become clogged with coke. Because of this clogging of checker brick, it has become the practice to vaporize such "heavy" oil by finely atomizing the oil into a carbureter devoid of checker brick.

As previously stated it has also become the practice to vaporize at least a portion of the "heavy" oil required for carbureting by spraying it onto the top of the fuel bed in the generator. In order to store more heat in the generator top for the vaporization and cracking of this carbureting oil, it has become the practice during the blow to admit secondary air to the generator above the fuel bed in order to initiate the combustion of the blow gases in the upper portion of the generator in contact with the top of fuel bed. As a result, a portion of the heat of combustion as well as a portion of the sensible heat of the blow gases is stored in the upper portion of the generator. Further heat of combustion as well as further sensible heat is stored in the carbureter and superheater during the passage of the burning blow gases therethrough.

It is advantageous to vaporize as large a portion of the carbureting oil as possible in the top of the generator, especially in the case of "heavy" oil because the residual coke resulting from such oil vaporization is deposited in the fuel bed, where it may be effectively utilized to reduce the quantity of solid fuel required for water gas generation.

One of the objects of the present invention is to improve the combustion of the blow gases in the top of the generator and to improve the distribution and storage of the heat resulting from the blow gas combustion.

Another object is to minimize accretions of carbon on the side walls or crown of the generator.

According to the present invention secondary air for combustion of the combustible producer gas issuing from the top of the fuel bed is admitted to the generator above the fuel bed at relatively high velocity and in such a manner as to produce a rapid rotation of the gases in the space within the generator above the fuel bed.

This rapid rotation may be conveniently effected by admitting the air to the generator above the fuel bed in a direction generally tangential and at a relatively high velocity.

The secondary air may be admitted through a single air admission means or through a plurality of air admission means. Care should be taken, however, to provide that the combined cross sectional area of any plurality of air admission conduits employed is not sufficiently great to reduce the entering velocity of the air sufficiently to prevent the production of a rapid rotation of gases in the generator top.

In previous practice, air has been admitted to the generator top through a large number of radially arranged air admission pipes branching from a bustle pipe disposed about the generator top.

Further, in accordance with the present invention, I prefer to provide each secondary air inlet to the generator with an individual valve preferably hydraulically operated and preferably arranged in close proximity to the point of admission of the air to the generator.

In previous practice, in which the secondary air admission has been controlled by a valve on the blower side of the bustle pipe, during the run oil vapors have been able to enter the bustle pipe through the plurality of air admission openings. As a result considerable quantities of carbon have been deposited in the bustle pipe necessitating frequent cleaning and occasioning the loss of considerable operating time due to shut-downs therefor.

Figure 1:
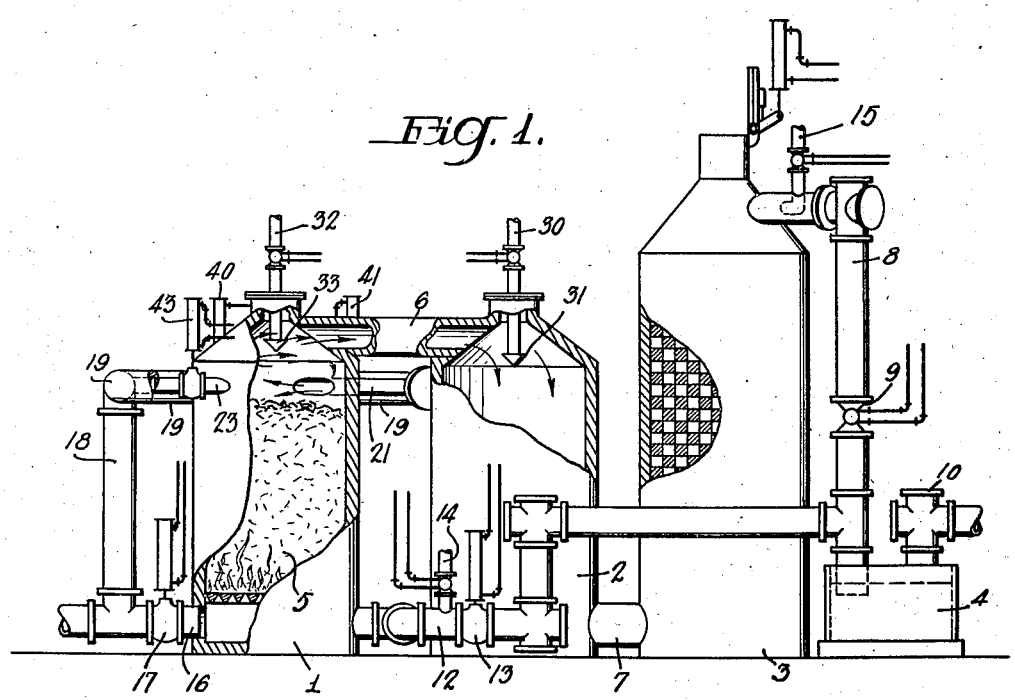

Other objects of the invention will become apparent to those skilled in the art as the specification proceeds and in connection with the description of the accompanying figures in which:

Figure 1 shows somewhat diagrammatically and partly in elevation and partly in vertical cross section, a carbureted water gas set arranged in accordance with one form of my invention which has been chosen for illustration; and Figure 2 shows a plan view of the carbureted water gas set of Figure 1.

Referring to the figures, 1 generally indicates a generator, 2 a carbureter, 3 a superheater, and 4 a wash box of a carbureted water gas set.

The generator 1 is provided with the ignited fuel bed 5.

Above the fuel bed the generator 1 is connected with the upper portion of the carbureter 2 by the connection 6. The base of the carbureter is connected with the base of the superheater by the connection 7. Connection 8, provided with valve 9, leads from the upper portion of the superheater to the wash box 4. Connection 10 leads from the wash box to storage or other disposal.

The superheater is provided with the stack valve 11.

Below the fuel bed the generator may be provided with the back run connection 12, controlled by valve 13, which leads to the wash box 4.

Steam supply 14 is provided for making up runs through the generator fuel bed. Steam supply 15 is provided for making back run through the generator fuel bed 5, by way of the superheater and carbureter.

Connection 16, provided with valve 17, supplies primary air to the fuel bed. Secondary air is supplied to the upper portion of the generator above the fuel bed through connection 18, bustle pipe 19, and the air inlet connections 20, 21, 22, and 23, which are illustrated as entering the upper portion of the generator tangentially. The air inlet connections 20, 21, 22 and 23 are individually provided with control valves 24, 25, 26, and 27 respectively.

Carbureting oil may be admitted to the carbureter through oil supply means 30, provided with a nebulizing spray 31. The carbureter is shown, for illustration, as devoid of checker brick. If desired and particularly in the use of carbureting oils other than "heavy" oil, the carbureter may be provided with checker brick and the spray need not be of the nebulizing type.

In the apparatus chosen for illustration, the generator is provided with the oil supply means 32, provided with spray 33, arranged to spray carbureting oil into the upper portion of the generator and preferably onto the top of the ignited fuel bed 5.

The following is a description of a cycle chosen as illustrating the operation of the apparatus of the figures.

The ignited fuel bed 5 is blasted with primary air supplied through air supply means 16, as controlled by valve 17. During this operation, the stack valve 11 is open and valve 13 closed.

The producer gas resulting from the air blast issues from the top of the fuel bed and is met by the secondary air entering above the periphery of the fuel bed through the tangential air inlets 20, 21, 22 and 23.

The number and cross section of these air inlets are chosen with reference to the quantity of secondary air required, so that the secondary air enters the top of the generator at relatively high velocity. The high velocity of the entering air and the tangential direction of its entrance produces a rapid rotation of the gases in the upper part of the generator and rapidly and intimately mixes together the secondary air with the combustible producer gas issuing from the top of the fuel bed.

It may be preferred to admit the secondary air above the fuel bed tangentially and in close proximity to the periphery of the fuel bed, as there is a tendency for a large portion of the producer gas to issue from the top of the fuel bed at or near its periphery, due to lower resistance to flow along and near the generator wall.

However, the combustible gas issuing from the fuel bed may be burned in contact with the top of fuel bed or in other heat transfer relation therewith.

For example the gases may be burned in contact with the generator walls and crown and the top of the fuel bed heated by radiation therefrom.

It is preferable to have the secondary air enter the upper portion of the generator with a linear velocity of at least 50 ft./sec. and still more preferably at least 120 ft./sec.

The rapid mixing of the secondary air with the produced gas and the high degree of turbulence produced in the space above the fuel bed promotes very rapid flame development and increases the quantity of heat released in the upper portion of the generator.

The burning gases pass from the generator by way of connection 6 to and through the carbureter 2 and by way of connection 7 to and through the superheater 3 issuing to the atmosphere through the stack valve 11, or they may pass from the superheater through a waste heat boiler (not shown).

Due to the very rapid and intimate mixing of secondary air and producer gas in the generator top and the rapid flame development therein, a shorter and hotter flame is produced, which tends to store more of the available heat in the top of the generator and carbureter and less in the superheater than is the case with ordinary combustion arrangements.

Furthermore due to variable permeability of the fuel bed, the producer gas arising from it will vary somewhat in composition at different portions of the cross section of the fuel bed. In the absence of equalizing and averaging influences, unequal mixtures of air and gas are thus produced. The rotation produced in my invention tends to mix all the gases together in the top of the generator and thus produce a uniform average mixture.

When the desired quantity of heat has been stored in the fuel bed, the top of the generator, carbureter and the superheater, the air blast is terminated and an up run may be made with steam supplied through 14.

During this operation the stack valve 11 and valve 13 are closed while valve 9 is open.

The steam passes upwardly through the ignited fuel bed reacting with the carbon therein to form blue water gas. The water gas issues from the top of the fuel bed and passes by way of connection 6 to the carbureter 2 and thence by way of connection 7 to superheater 3 and by way of connection 8 to the wash box 4 and thence through connection 10 to storage.

As the water gas issues from the top of the fuel bed, it is carbureted with oil supplied through oil supply 32 and spray 33. The oil spray is preferably directed onto the top of the fuel bed and the oil is vaporized by the heat stored therein during the air blast, assisted by the heat stored in the refractory lining of the upper portion of the generator.

The spray may be arranged to deliver the oil to the outer portion of the fuel bed top or may be arranged to spray the oil uniformly over the entire top of the fuel bed, or otherwise.

The resultant oil vapors pass with the water gas through the carbureter and superheater where they are cracked to fixed gases by the heat stored in these vessels.

Any desired portion of the carbureting oil may be admitted to the carbureter through oil supply 30 and spray 31.

As before indicated in the event that "heavy" oil is employed, it is preferable to employ a carbureter devoid of checker brick and employ a spray capable of finely atomizing the oil.

After the up run, a back run may be made, with a stack valve 11 and valve 9 closed and valve 13 opened. Steam is supplied through steam supply 15 and passes reversely through the set by way of the superheater 3, connection 7, carbureter 2, connection 6 and thence downwardly through the generator fuel bed, the resultant water gas passing by way of connection 12 to the wash box and thence by way of connection 10 to storage. During the back run, if desired, oil may be admitted through either or both of oil supply means 30 and 32, the resultant oil vapors passing downwardly through the fuel bed together with the steam and being cracked or "reformed" therein to any desired extent.

After the back run, the cycle may be repeated.

In the cycle the necessary purges will, of course, be made as will be readily understood by those skilled in the art.

The above cycle is given merely for purposes of illustrations and is capable of a great deal of modification. For example, instead of a back run with steam supplied at 15, steam might be supplied to the top of the generator and a down run made through the fuel bed, the down run gas passing to the wash box by way of connection 12.

The order of the steps in the cycle may be widely varied.

Such modifications, as well as others such as the use of blow runs and other expedients will readily occur to those skilled in the art.

The provision of individual valves 24, 25, 26, and 27 controlling respectively the air inlets 20, 21, 22 and 23 permits the cutting off of communication from the generator to the bustle pipe 19 during the run and prevents oil vapors from entering the bustle pipe or from entering into the tangential air inlet connections for any appreciable distance.

Such entrance of oil vapors into the bustle pipe has in the past been responsible for considerable carbon accumulation therein and has made necessary periodic shut downs of the apparatus for cleaning.

The valves 24, 25, 26 and 27 individually controlling the supply of air through the tangential air inlets may be hydraulically operated from an automatic control machine. To that end the valves 24, 25 and 26 are shown provided with hydraulic cylinders and with hydraulic lines leading therefrom to and from the automatic control machine (not shown).

Automatic control machines are commonly provided in the water gas practice to operate the valves of the water gas set in the desired predetermined sequence. As the employment of such automatic controls is well known to those skilled in the art, it is thought that any extended description is unnecessary.

As previously stated, the present invention is particularly advantageous in connection with the use of "heavy" oil, although it may be advantageously employed in connection with the use of any oil.

"Heavy" oil in general requires proportionally more heat for vaporization and less for fixing than is the case with the usual gas oil. The more intimate mixing of the secondary air with the producer gas in the top of the generator and the shorter flame produced leads to a heat distribution in the generator top, carbureter, and superheater which is especially advantageous in "heavy" oil operation, more heat being stored in the generator and carbureter tops and less in the superheater than is usual.

Due to the greater release of heat in the generator top, more oil can be gasified on the top of the fuel bed, leaving a small proportion of oil, if any, to be vaporized in the carbureter.

This is advantageous in connection with the use of any oil but is of more particularly so in connection with "heavy" oil operation since "heavy" oil on vaporization yields very considerable quantities of coke. When the vaporization takes place on the fuel bed, this coke becomes part thereof. It is then available as fuel for the production of water gas and takes the place of considerable solid fuel which would otherwise be consumed.

When such oil is gasified in the carbureter, the carbon deposited is usually merely a nuisance.

The circular motion produced by the tangential admission of secondary air to the generator top also promotes contact of the gases with any carbon which may be deposited from the oil on the generator walls. This greatly assists in consuming such carbon, preventing its accumulation and converting it into useful heat.

Water gas is usually enriched by the vaporization and cracking of petroleum oil fractions, however, the present invention may be employed in connection with other hydrocarbon enriching liquids such as tars and conceivably other enriching materials not necessarily hydrocarbons such for example as alcohols might be supplied.

While the present invention may have its greatest usefulness in connection with carbureted water gas manufacture and in connection with the use of heavy oil, and while for this reason the invention has been described in that connection, the invention may be employed in blue water gas manufacture, particularly when the stored heat of the blast gases is utilized to superheat the down run steam.

Also the described method of heating the zone above the fuel bed for the vaporization of carburetting oil may be readily applied to the carbureting of air blast gases issuing from the top of the fuel bed, or to the carburetting of producer gas produced by passing air and steam simultaneously upward through the fuel bed.

Further, in connection with carbureted water gas manufacture the operation may be widely varied from that described, for example all of the oil may be vaporized during the back run, the resulting vapors being passed through the fuel bed to produce low gravity gas.

In the claims the terms "comprises" and "comprising" are employed in their usually accepted meanings and do not exclude the employment of other steps or the presence of other means than those recited.

The invention has been described in connection with one form thereof chosen for illustration.

Therefore, changes, omissions, additions, substitutions, and/or modifications may be made within the scope of the claims without departing from the spirit of the invention which is intended to be limited only as required by the prior art.

I claim:

1. A process for the manufacture of water gas comprising periodically upwardly blasting an ignited bed of solid fuel with primary air thereby storing heat within said fuel bed and generating combustible blast gas, simultaneously burning said blast gas in a combustion zone arranged above and in direct heat transfer relation with the top of said fuel bed by means of secondary air introduced into said blast gas in said combustion zone in a direction generally normal in the horizontal plane to the radius of a circle in that plane having its center in the vertical axis of the fuel bed, said introduction of secondary air into said blast gas being in a manner to produce a rapid rotation of burning blast gas in said zone in direct heat transfer relation with the top of said fuel bed, thereby heating said zone including the top of said fuel bed and storing heat therein; and between air blasting steps passing steam through said fuel bed thereby generating blue water gas.

2. A process for the manufacture of water gas comprising periodically upwardly blasting an ignited bed of solid fuel with primary air thereby storing heat within said fuel bed and generating combustible blast gas, simultaneously burning said blast gas in a combustion zone arranged above said fuel bed and in contact with the top of said fuel bed by means of secondary air introduced into said blast gas in said combustion zone in a direction generally normal in the horizontal plane to the radius of a circle in that plane having its center in the vertical axis of the fuel bed, said introduction of secondary air into said blast gas being in a manner to produce a rapid rotation of burning gas in said zone in direct heat transfer relation with the top of said fuel bed thereby heating said zone including the top of said fuel bed; between air blasting steps superheating steam by means of said stored heat in said zone, and passing said steam through said fuel bed thereby generating blue water gas.

3. A process for the manufacture of carbureted water gas comprising periodically upwardly blasting an ignited bed of solid fuel with primary air thereby storing heat within said fuel bed and generating combustible blast gas, simultaneously burning said blast gas in a combustion zone arranged above said fuel bed and in direct heat transfer relation with the top of said fuel bed by means of secondary air introduced into said blast gas in said combustion zone in a direction having a horizontal component generally normal to the radius of a circle in the horizontal plane having its center in the vertical axis of the fuel bed, said introduction of secondary air into said blast gas being in a manner to produce a rapid rotation of burning gas in said zone in direct heat transfer relation with the top of said fuel bed thereby heating said zone including the top of said fuel bed and storing heat therein; between air blasting steps passing steam through said fuel bed thereby generating blue water gas, and simultaneously carburetting said blue water gas by spraying liquid combustible gas enriching material into said zone for vaporization therein in the presence of said blue water gas by the heat previously stored therein.

4. A process for the manufacture of carburetted water gas comprising periodically upwardly blasting an ignited bed of solid fuel with primary air thereby storing heat within said fuel bed and generating combustible blast gas, simultaneously burning said blast gas in a combustion zone arranged above said fuel bed and in contact with the top of said fuel bed by means of secondary air introduced into said blast gas in said zone adjacent the periphery of said fuel bed and in a direction having a horizontal component normal to the radius of a circle in the horizontal plane having its center in the vertical axis of the fuel bed, said introduction of secondary air being in a manner to produce a rapid rotation of burning gas in said zone in direct heat transfer relation with the top of said fuel bed thereby heating said zone including the top of said fuel bed and storing heat therein; between air blasting steps passing steam upwardly through said fuel bed thereby generating blue water gas, and simultaneously carburetting said blue water gas by spraying liquid hydrocarbon enriching material into said zone for vaporization therein in the presence of said blue water gas by the heat stored in said zone.

5. A process for the manufacture of carburetted water gas comprising periodically upwardly blasting an ignited bed of solid fuel with primary air thereby storing heat within said fuel bed and generating combustible blast gas, simultaneously burning said blast gas in a combustion zone arranged above said fuel bed and in contact with the top of said fuel bed by means of secondary air introduced into said blast gas in said zone adjacent the periphery of said fuel bed in a direction generally normal in the horizontal plane to the radius of a circle having its center in the vertical axis of the fuel bed, said introduction of secondary air into said blast gas being in a manner to cause the ignition and the rapid rotation of the blast gas issuing from the top of the fuel bed at its periphery, thereby storing heat in said combustion zone including the top of said fuel bed; between air blasting steps passing steam upwardly through said fuel bed thereby generating blue water gas, and simultaneously carburetting said blue water gas by spraying petroleum oil into said zone for vaporization by the heat stored therein.

6. A process for the manufacture of carburetted water gas comprising periodically upwardly blasting an ignited bed of solid fuel with primary air thereby storing heat within said fuel bed and generating combustible blast gas, simultaneously burning said blast gas in a combustion zone arranged above said fuel bed and in contact with the top of said fuel bed by means of secondary air introduced into said blast gas in said zone adjacent the periphery of the top of said fuel bed and in a direction generally normal in the horizontal plane to the radius of a circle having its center in the vertical axis of the fuel bed, said introduction of secondary air being in a manner to ignite and rapidly rotate blast gas issuing from the top of the fuel bed at its periphery thereby storing heat in said zone including the top of said fuel bed; between air blasting steps passing steam upwardly through said fuel bed thereby generating blue water gas, and simultaneously carburetting said blue water gas by spraying heavy petroleum oil onto the top of said fuel bed for vaporization by the heat stored therein.

7. A process for the manufacture of carburetted water gas comprising periodically upwardly blasting an ignited bed of solid fuel with primary air thereby storing heat in said fuel bed and generating combustible blast gas, simultaneously burning said blast gas in a combustion zone arranged above said fuel bed and in contact with the top of said fuel bed by means of secondary air introduced into said blast gas in said zone at a plurality of points adjacent the periphery of the top of said fuel bed and in directions generally normal in the horizontal plane to the radiums of a circle having its center in the vertical axis of the fuel bed, said introductions of secondary air being in a manner to produce a rapid rotation of burning gas in said combustion zone in contact with the top of said fuel bed thereby storing heat in said zone including the top of said fuel bed; between air blasting steps passing steam upwardly through said fuel bed thereby generating blue water gas, and simultaneously carburetting said blue water gas and spraying carburetting oil onto the top of said fuel bed for vaporization by heat stored therein.

8. A process for the manufacture of carburetted water gas comprising periodically upwardly blasting an ignited bed of solid fuel with primary air thereby storing heat within said fuel bed and generating combustible blast gas, simultaneously burning said blast gas in a combustion zone arranged above said fuel bed and in direct heat transfer relation with the top thereof by means of secondary air introduced into said blast gas in proximity to the top of said fuel bed and in such direction with respect to the lateral boundary of said zone as to produce a rapid rotation of said blast gas and an intimate mixing of the burning gas with air, said rotation taking place in direct contact with the top of said fuel bed and storing heat therein; between air blasting steps passing steam upwardly through said fuel bed thereby generating blue water gas, and simultaneously carburetting said blue water gas by spraying heavy oil onto the top of said fuel bed for vaporization thereon in the presence of said blue water gas by the heat stored in said zone including the top of said fuel bed.

9. A process for the manufacture of carburetted water gas comprising periodically upwardly blasting an ignited bed of solid fuel with primary air thereby storing heat in said fuel bed and generating combustible blast gas, simultaneously burning said blast gas in a combustion zone arranged above and bonded beneath by the top of said fuel bed by means of secondary air introduced into said combustion zone in proximity to the top of said fuel bed and in such direction to the lateral boundary of said zone as to produce a rapid rotation of burning blast gases in said zone in direct contact with the top of said fuel bed thereby heating said zone including the top of said fuel bed; leading off the burning blast gas through at least one other heat storage zone and storing heat in refractory heat storage material contained therein; between air blasting steps passing steam upwardly through said fuel bed thereby generating blue water gas, simultaneously carburetting blue water gas by spraying petroleum oil into the top of said fuel bed for vaporization by the heat stored therein; also between air blasting steps superheating steam by means of the heat stored in said refractory heat storage material and in said combustion zone during said air blasting step, and passing the resulting superheated steam downwardly through said fuel bed thereby generating blue water gas.

10. In water gas apparatus comprising a generator adapted to contain an ignited fuel bed and means for upwardly blasting said fuel bed with primary air and means for steaming said fuel bed, the improvement comprising secondary air inlet means generally tangential to the inner periphery of said generator above the top of said fuel bed and in the proximity of the periphery of the top of said fuel bed as distinguished from the vertical axis of said fuel bed.

11. In water gas apparatus comprising a generator adapted to contain an ignited fuel bed and at least one heat storage vessel provided with refractory heat storage material and connected in series with said generator above said fuel bed, said generator being provided with means for upwardly air blasting said fuel bed with primary air and said apparatus being provided with means for passing steam through said heat storage vessel and thence through said generator fuel bed, the improvement comprising a plurality of secondary air inlet conduits arranged tangentially to the inner periphery of said generator above the top of said fuel bed and in the proximity of the periphery of said fuel bed as distinguished from the proximity of its vertical axis.

12. Carburetted water gas apparatus comprising a generator adapted to contain an ignited fuel bed, means for upwardly blasting said fuel bed with primary air, means for passing steam through said fuel bed, means for spraying oil into the top of said generator above said fuel bed, and secondary air inlet means arranged tangentially to the inner periphery of said generator above said fuel bed and in the proximity of the periphery thereof as distinguished from its vertical axis.

13. Carburetted water gas apparatus comprising a generator adapted to contain an ignited fuel bed, at least one heat storage vessel in gas flow communication with said generator above said fuel bed, means for upwardly blasting said fuel bed with primary air, a plurality of individual secondary air inlets arranged tangentially to the interior of the generator above the top of the fuel bed and in the proximity of the periphery of the fuel bed top as distinguished from the proximity of the vertical axis of the fuel bed, means for passing steam upwardly through said fuel bed, and means for spraying oil into the top of said generator above said fuel bed.

14. A carburetted water gas set comprising a generator adapted to contain an ignited fuel bed, a carburetter and a superheater connected in series, means for upwardly blasting said fuel bed with primary air, means for supplying secondary air to said set comprising a plurality of individual secondary air inlet means arranged tangentially to the inner periphery of said generator above said fuel bed and in the proximity of the perimeter of the top of the fuel bed as distinguished from the proximity of the vertical axis of said fuel bed, means for passing steam through said fuel bed, means for introducing oil to said generator above said fuel bed, and means for introducing oil to said carburetter.

15. A carburetted water gas set comprising a generator adapted to contain an ignited fuel bed, a carburetter and a superheater connected in series, means for upwardly air blasting said fuel bed with primary air, means for supplying secondary air to said set comprising a plurality of secondary air inlet conduits arranged tangentially to the inner periphery of said generator above said fuel bed and in the proximity of the perimeter of the fuel bed as distinguished from the proximity of its vertical axis, means for spraying oil onto the top of said fuel bed, means for spraying oil into said carburetter, means for passing steam upwardly through said fuel bed, means for passing steam reversely through said set including said generator fuel bed, means for leading off blast products from said superheater to the atmosphere, and means for leading off water gas from said superheater and from the base of said generator.

JOHN S. HAUG.